Patented May 16, 1950

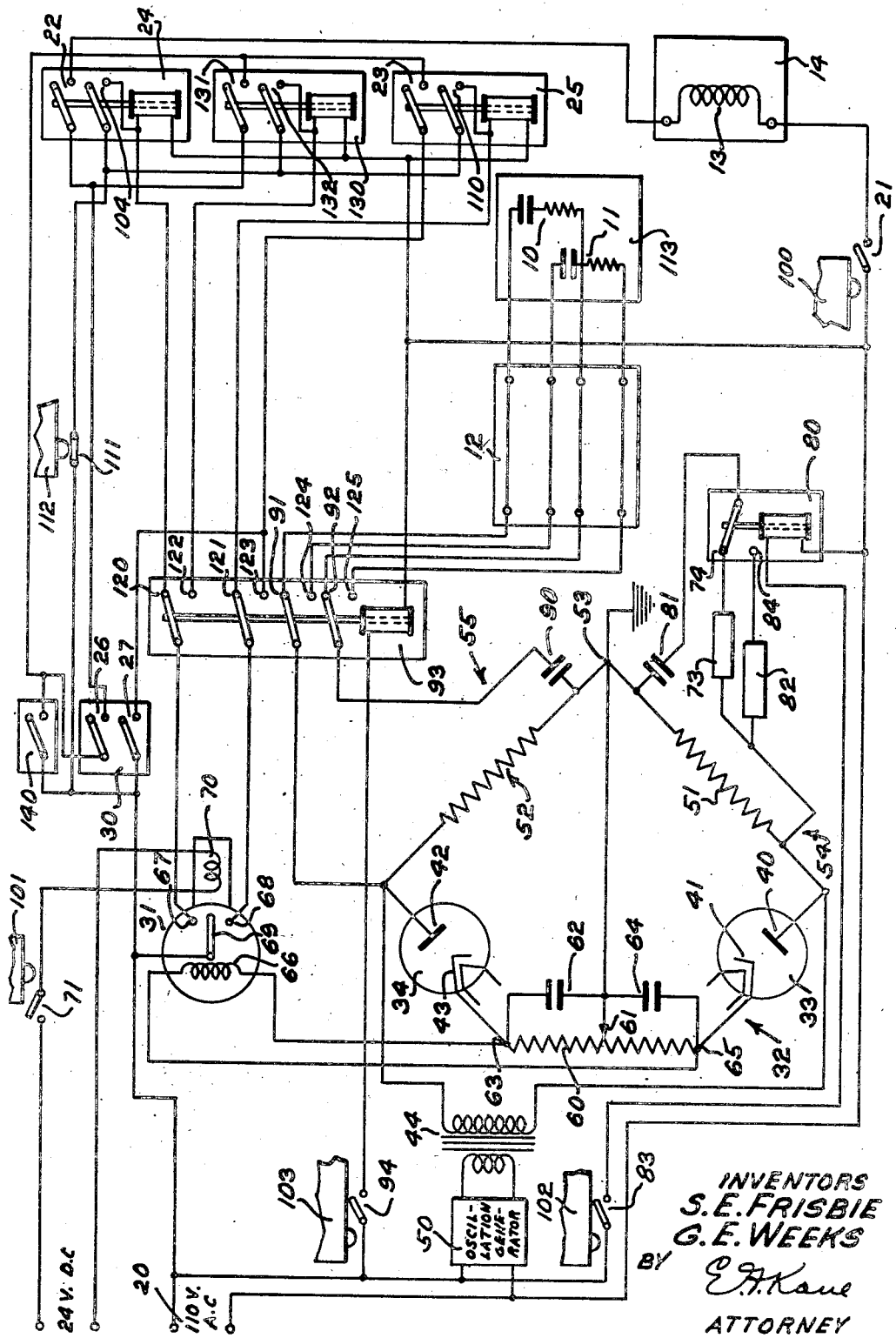

2,507,566

UNITED STATES PATENT OFFICE 2,507,566

ELECTRICAL TESTING APPARATUS

Stewart E. Frisbie, Danville, and Gilbert E. Weeks, Chicago, Ill., assignors, by direct and mesne assignments, to Western Electric Company, Incorporated, New York, N. Y., a corporation of New York Application August 30, 1948, Serial No. 46,794

6 Claims. (Cl. 175—183)

This invention relates to electrical testing apparatus and more particularly to automatic impedance measuring apparatus.

An object of this invention is to provide a new and efficient apparatus for determining electrical characteristics of articles.

In accordance with one embodiment of this invention an apparatus is provided for automatically determining whether or not a pair of separate impedance units fall within predetermined minimum and maximum impedance limits desired for each impedance unit. The apparatus is provided with an impedance detector equipped with a number of selectively connectible standards and means for sequentially comparing the impedance units under test against the standards, the output of the detector being adapted to operate and lock a separate relay for each of the following conditions if the pair of impedance units meets the following test: Impedance unit No. 1, less than maximum and more than minimum; impedance unit No. 2, less than maximum and more than minimum. The contemporaneous operation of the four relays closes a circuit to an acceptance solenoid which may be adapted to operate either an indicator or a mechanical separating device. Failure of either of the impedance units to pass either its minimum or maximum tests will fail to operate the particular relay associated with that condition, thereby failing to complete the circuit to the acceptance device.

A complete understanding of the invention may be had by referring to the following detailed description taken in conjunction with the accompanying single figure drawing which diagrammatically illustrates one embodiment of the invention.

The apparatus described herein may be used to check the impedance of a single impedance unit 10 or two impedance units 10 and 11 in an automatic sequence, the impedance unit or units under test being placed in a test fixture 12 which supports the impedance units and connects them with the test circuit. The object of this test is to energize the operating coil 13 of an acceptance device 14 if the impedance value of the impedance unit or units under test falls within the required maximum and minimum limits. In case an impedance unit fails the test, the operating coil 13 will remain unenergized. The acceptance device 14 may be an indicator or it may be a mechanical device for causing the separation of acceptable impedance units from unacceptable units.

In case one impedance unit 10 is being tested the operating coil 13, when energized, receives its power from a source of electrical current 20 through a closed switch 21, closed contact 22 of relay 24, contacts 26 of a switch 30, contacts 23 of relay 25, and contacts 27 of switch 30, the relay 24 being energized when the impedance of the test unit 10 is less than the permitted maximum and the relay 25 being energized and locked if the impedance of the unit 10 is more than the permissible minimum. The relays 24 and 25 are operable in response to the action of a meter relay 31 controlled by an impedance detector 32 which is responsive to the impedance of the unit 10 under test.

The impedance detector 32, which includes the meter relay 31, is a symmetrical circuit and comprises a pair of half-wave electronic rectifiers 33 and 34, the rectifier 33 having an anode 40 and a cathode 41 and the rectifier 34 having a similar anode 42 and cathode 43. The anodes 40 and 42 are connected through an isolating transformer 44 to an oscillation generator 50 and are also connected to similar resistors 51 and 52 which are joined at 53 and form parts of two adjacent comparative branches 54 and 55 of the detector 32.

The cathodes 41 and 43 are connected to opposite ends of a resistor 60 having a variable contact arm 61 which is connected to the junction 53. A filter condenser 62 is connected between the contact arm 61 and the cathode 43 at a circuit junction 63 and a similar condenser 64 is connected between the contact arm 61 and the cathode 41 at a circuit junction 65. The output of the detector 32 is taken at the junction points 63 and 65 and connected to the operating coil 66 of the meter relay 31 which is adapted to close circuits at 67 or 68 through its needle armature 69 depending on the direction of the current flow through the coil 66. A coil 70 for restoring the meter armature 69 to neutral is energized by the closing of a timing switch 71.

As shown in the drawing a standard impedance 73 is connected to the branch 54 through the normally closed contacts 74 of a relay 80 and a condenser 81, the standard 73 and the condenser 81 forming a parallel path of the branch 54. A second standard impedance 82 may be substituted for the first standard 73 by operation of the relay 80 which is energized by the closure of a timing switch 83. Operation of the relay 80 breaks the circuit at 74 and closes the circuit at 84. The impedance unit 10, under test, together with a condenser 90 form a parallel half of the branch 55, connection being made through closed contacts 91 and 92 of a relay 93 which is also provided with a plurality of other contacts for the make and break of other circuit portions. Power when necessary to energize the relay 93 is applied to it by the closure of a timing switch 94.

The operation of the timing switches 21, 71, 83 and 94 in a predetermined timed sequence may be effected manually or by properly timed cams 100, 101, 102 and 103 which may be operated in any suitable known manner.

In the operation of the detector 32 the direct current voltage drop across the portion of the resistor 60 between the contact arm 61 and circuit point 63 is proportional to the impedance of the branch 52, and the direct current voltage drop across the portion of the resistor between the contact arm 61 and circuit point 65 is proportional to the impedance of the branch 54. Any impedance changes in the branches 52 or 54 will be reflected in the amplitudes of the currents flowing through both portions of the divided resistor 60 and since the currents flow in opposite directions, the differential value (algebraic sum) will cause the meter relay 31 to operate in a direction indicative of the relation between the impedance values of the branches 52 and 54. The detector 32 being a symmetrical circuit, the standards 73 and 82 may be of substantially the maximum and minimum impedance reference values, respectively.

In testing a single impedance unit 10 the switch 30 remains closed during the entire test and the initial position of the other switches and the relays are as shown in the drawing. After the impedance unit 10 is connected to the fixture 12, the detector 32 will respond to the value of the impedance 10, and if the impedance is less than the permitted maximum, the armature 69 of the meter relay 31 will operate upward to close the circuit at 67 thereby applying power from the source 20 to the relay 24, energizing the relay, and closing its contacts 22 and 104. Closure of contacts 104 locks the relay 24 in an operated position. Switch 71 is next closed either manually or by the timed cam 101 to restore the meter relay armature 69 to neutral after which switch 83 is closed either manually or by the timed cam 102 thereby energizing and operating the relay 80 to break the circuit at 74 and close the circuit at 84 thus substituting the minimum impedance standard 82 for the maximum standard 73 as part of the branch 54 of the detector 32. Switch 71 is opened at this time to release the armature 69 of the meter relay 31 and if the impedance of the unit 10 is more than the permitted minimum then the detector 32 will respond in such a manner that the armature 69 of the meter relay 31 will be operated downward to close the circuit at 68 thereby applying power from the source 20 to the relay 25 thus to energize the relay and close its contacts 23 and 110. Closure of the contacts 110 locks the relay 25 in an operated position. Switch 21 is then closed either manually or by means of the timed cam 100 thereby completing a circuit from the source of power 20 to the operating coil 13 of the acceptance device 14. This, of course, energizes the coil 13 and operates the device 14 thus indicating that the impedance unit 10 has passed its test in that the value of its impedance was within the permitted minimum and maximum limits. After the test is completed, switch 71 is momentarily closed and a switch 111 momentarily opened, either manually or by their associated timed cams 101 and 112, respectively, to reset the meter relay 31 and the relays 24 and 25 to normal. If the unit under test fails either the maximum or the minimum tests, the meter relay 31 will not operate in the right direction, resulting in the failure of either relay 24 or 25 to operate and therefore maintaining an open circuit at contacts 22 or 23. Because of this, the operating coil 13 could not be energized after the timing switch 21 is closed.

In the manufacture of certain types of networks for communications apparatus it is often convenient to mount one separate impedance unit in a single can, for example, impedance units 10 and 11 in a can 113. A pair of such units may be tested in automatic sequence for minimum and maximum impedance limits by connecting them, as shown in the drawing, to the test fixture 12 in this test. The initial position of all the switches and relays is as shown in the drawing. As in the previous test, if the impedance unit 10 falls within the prescribed limits, the relays 24 and 25 will be sequentially energized and locked. The timing switch 94 is then closed to energize and operate the relay 93 to open the contacts at 120, 121, 91 and 92 and close the circuit at contacts 122, 123, 124 and 125. It will be seen that the break at 91 and 92 and the make at 124 and 125 substitutes the impedance unit 11 in place of the impedance unit 10 as part of the branch 55 of the detector 32. In the meantime the switch 83 is opened either manually or by the passing of the cam 102 to release the relay 80 in order to again connect the maximum standard 73 into the detector circuit. Switch 71 is then opened to release the armature 69, and if the impedance of the unit 11 is below the permitted maximum, the armature 69 of the meter relay 31 will operate upward and close the circuit at 67 thereby conducting operating current from the source 20 to a relay 130 to close its contacts 131 and 132. The relay 130 is locked in operated position through the circuit at contacts 132, and the closure of contacts 131 adds another link in the circuit from the power source 20 to the operating coil 13.

The meter relay armature 69 is next restored to neutral by closing the switch 71, and the minimum impedance standard 82 is substituted for the maximum standard 73 in the detector 32 by closing switch 83. If the impedance of the unit 11 is above the permitted minimum, the detector 32 will respond to operate the meter relay armature 69 downward and close the circuit at 68 to add a further link in the circuit from the power source 20 to the operating coil 13, which circuit is next completed by the closing of the switch 21 thereby energizing the coil 13. The path from the power source 20 to the coil 13 includes the meter relay armature 69, contacts 68, 123, 23, 131 and 22 and the switch 21. To clear the set for the next units to be tested, switch 71 is momentarily closed and switch 111 momentarily opened to restore the relays 31, 24, 130 and 25 to normal, and switches 94 and 83 are opened to restore the relays 80 and 93 to normal. Again as in the previously described tests, if either of the impedance units 10 or 11 had failed in either of its tests, one or more relays would fail to operate properly, resulting in open links in the power circuit from the source 20 to the operating coil 13, thus preventing its energization.

It is often the practice in the manufacture of impedance units having different values to mount them in similar containers without external markings to identify them. With this apparatus it is possible to separate a mixed batch of high and low value impedance units by setting up the apparatus to accept units having an impedance lower than a predetermined maximum. In order to test single units 10 for less than maximum impedance, the switch 30 and a switch 140 are closed for the duration of the test and the initial positions of the other switches and relays are those shown on the drawing. If the unit under test is less than maximum, the meter relay armature 69 will operate upward and close the circuit at 67 to conduct operating current from the power source 20 to the relay 24, thereby closing the contacts 22 and 104 of the relay. The relay 24 is locked by the closure of contacts 104, and the closure of contacts 22 completes the circuit from one side of the power source 20 to the upper end of the operating coil 13 through switch 140 and contacts 26 and 22. The power circuit is completed by the closing of switch 21. As in the previously described tests the circuit is restored to normal by momentarily opening switch 111 and closing switch 71.

If the impedance unit 10 under test had been more than maximum, the operating coil 13 would have remained unenergized, thus distinguishing such a unit as having more than the predetermined maximum impedance.

In order to distinguish between double units in single containers having lower than a predetermined maximum impedance from those having an impedance higher than the maximum, switch 30 is opened and switch 140 is closed during the test. The initial position of the other switches and the relays are those shown in the drawing. After a double unit 113 having impedance elements 10 and 11 is connected as shown in the drawing, the meter relay armature 69 will operate upward and close the circuit at 67 if the impedance of the element 10 is less than the maximum. The circuit through 67 conducts operating current from the power source 20 to the relay 24, thus closing the contacts 22 and 104. Closure of the contacts 104 locks the relay 24 in the operated position and closure of contact 22 forms a link in the circuit from the power source 20 to the upper end of the operating coil 13.

Switch 71 is then closed to restore the meter relay 31 to neutral, after which switch 94 is closed to operate the relay 93, thereby substituting the impedance element 11 for the element 10 in the branch 55 of the detector 32. In addition to the switch-over from one element to another the relay 93 opens the circuit at 120 and 121 and closes the circuit at 122 and 123. Switch 71 is then opened to release the meter relay armature 69 which will move upward and close the circuit at 67 if the impedance of the element 11 is less than maximum. This applies operating current to the relay 130 through the contacts 67 and 122 and closes the contacts 131 and 132. Closure of the contact 132 locks the relay 130, and closure of contact 131 completes the circuit from the power source 20 to the upper end of the operating coil 13, after which switch 21 is closed, thereby energizing the coil 13 and operating the acceptance device 14. The current path from the power source 20 to the operating coil 13 includes the switch 140, the contacts 131 and 22 and the switch 21. The apparatus may be cleared for the next unit by momentarily closing switch 71, momentarily opening switch 111, and opening switch 94.

If the elements 10 and 11 had an impedance higher than the predetermined maximum then the meter relay armature 69 would have operated downward and the relays 24 and 130 would have remained unenergized, leaving an open circuit between the power source 20 and the upper end of the operating coil 13. In this case the coil 13 could not be energized after the closure of switch 21.

Although the detector 32 is responsive to impedance it is apparent that detectors responsive to other electrical characteristics could be substituted in the circuit without departing from the spirit and scope of the invention. The detector shown being responsive to impedance may also be used to detect components of impedance, such as, reactance and resistance, especially if a device under test is a substantially pure reactance or a substantially pure resistance. In cases of substantially pure reactances, the detector 32 may be set to detect capacitance or inductance.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An electrical testing apparatus comprising a detector for detecting electrical characteristics, said detector having a first circuit closing means and a second circuit closing means, the first circuit closing means being responsive to detected values of the electrical characteristic below a predetermined value and the second circuit closing means being responsive to detected values above a predetermined value, a first locking relay, a second locking relay, a third locking relay, switching means for selectively connecting the first circuit closing means to either the first or the second relay thereby to make the first and the second relays individually responsive to the first circuit closing means when either is conected thereto, means for selectively connecting the second circuit closing means to either the third relay or an alternative circuit thereby to selectively make the third relay responsive to the second circuit closing means or to close said alternative circuit in response to the second circuit closing means, and an acceptance circuit operable in response to the contemporaneous operation of the first, the second, and the third relays and the closing of the alternative circuit.

2. An electrical testing apparatus comprising a detector for comparing impedance devices under test with standard impedances, a plurality of standard impedances, means for selectively connecting either of said impedance standards to said detector, means for connecting an impedance device to be tested to said detector, means for substituting a second impedance device to be tested for the first device, said detector having a first circuit closing means responsive to predetermined impedance values of the device under test below a predetermined value and a second circuit closing means responsive to predetermined impedance values of the device under test above a predetermined value, a first locking relay operable in response to the first circuit closing means, a second locking relay operable in response to the second circuit closing means, a third locking relay, switching means for causing the third relay to operate in response to the first circuit closing means, switching means for causing the second circuit closing means to close an alternative circuit instead of operating the second relay, and an acceptance circuit operable in response to the contemporaneous operation of the first, second and third relays and the closure of the alternative circuit.

3. An electrical testing apparatus comprising a detector for comparing an electrical characteristic of devices under test with that of standard devices, a maximum standard device, a minimum standard device, means for selectively connecting either of said standard devices to said detector, means for connecting a device to be tested to said detector, means for substituting a second device to be tested for the first device to be tested, said detector having a first and a second circuit closing means, the first circuit closing means being operable if the value of the electrical characteristic of the device under test is less than a predetermined maximum, the second circuit closing means being operable if the value of the electrical characteristic of the device under test is greater than a predetermined minimum, a first locking relay operable in response to the first circuit closing means, a second locking relay operable in response to the second circuit closing means, a third locking relay, switching means for causing the third relay to operate in response to the first circuit closing means, switching means for causing the second circuit closing means to close an alternative circuit instead of operating the second relay, and an acceptance circuit operable in response to the contemporaneous operation of the first, second and third relays and the closure of the alternative circuit.

4. An electrical testing apparatus comprising an impedance detector having means for connecting thereto an impedance device to be tested, a relay connected to said detector, said relay having a first and a second circuit closing means, the first circuit closing means being responsive through the detector to a test impedance connected to the detector having an impedance value less than a predetermined maximum, the second circuit closing means being responsive through the detector to a test impedance connected to the detector having an impedance value greater than a predetermined minimum, a second relay operable in response to said first circuit closing means, a third relay operable in response to said second circuit closing means, switching means for substituting a second impedance device to be tested in place of said first impedance device being tested, a fourth relay operable in response to said first circuit closing means when the second impedance device is substituted for the first one by said switching means, and an acceptance circuit operable in response to the contemporaneous operation of said second, third and fourth relays, and the closing of said second circuit closing means after said substitution.

5. An electrical testing apparatus comprising a detector for comparing impedance devices under test with standard impedances, a standard maximum impedance, a standard minimum impedance, means for selectively connecting either of said impedance standards to said detector, means for connecting an impedance device to be tested to said detector, means for substituting a second impedance device to be tested for the first impedance device, said detector having a first and a second circuit closing means, the first circuit closing means being operable if the impedance value of the device under test is less than a predetermined maximum, the second circuit closing means being operable if the impedance value of the device under test is greater than a predetermined minimum, a first locking relay operable in response to the first circuit closing means, a second locking relay operable in response to the second circuit closing means, a third locking relay, switching means for causing the third relay to operate in response to the first circuit closing means, switching means for causing the second circuit closing means to close an alternative circuit instead of operating the second relay, and an acceptance circuit operable in response to the contemporaneous operation of the first, second and third relays and the closure of the alternative circuit.

6. An electrical testing apparatus comprising an impedance detector for comparing impedance devices with standard impedances, a first relay operable in response to changes in the detector caused by the device under test, said relay having alternative circuit closing means, means for connecting an impedance device to be tested to said detector, an impedance standard having different selectable values, means for connecting one value of the standard impedance to said detector for a first interval of time, a source of voltage, a second locking relay operable in response to operation of the first relay closing a first alternative circuit, means operable after the first interval of time for changing the value of the standard impedance in the detector for a second interval of time, a third locking relay operable in response to operation of the first relay closing a second alternative circuit, means operable after the second time interval for making the first relay operable to close either a third or a fourth alternative circuit, means operable after the second interval of time for substituting a second device to be tested for the first device under test, means operable after the second time interval for changing the value of the standard impedance in the detector for a third interval of time, a fourth locking relay operable in response to operation of the first relay closing the third alternative circuit, means operable after the third interval of time for changing the value of the standard impedance in the detector, and an acceptance device operable in response to voltage from said source transmitted to the acceptance device when the second, third and fourth relays are operated and the fourth alternative circuit is closed by the first relay.

STEWART E. FRISBIE.
GILBERT E. WEEKS.

REFERENCES CITED

The following references are of record in the file of this patent:

UNITED STATES PATENTS

| Number | Name | Date |
|---|---|---|
| 1,983,388 | Moore | Dec. 4, 1934 |
| 2,153,990 | Paulson | Apr. 11, 1939 |
| 2,363,577 | Dexter | Nov. 28, 1944 |
| 2,417,488 | Handforth et al. | Mar. 18, 1947 |